Figure 5:
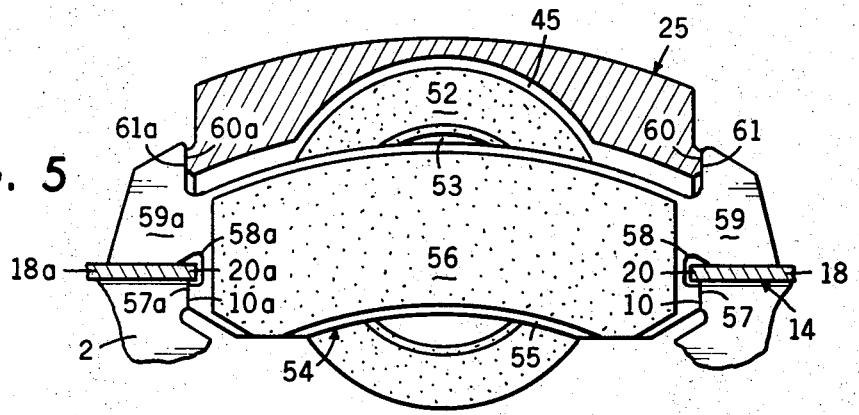

United States Patent

[11] 3,536,166

| [72] | Inventor | Edward J. Falk<br>St. Louis, Missouri |
|---|---|---|
| [21] | Appl. No. | 752,694 |
| [22] | Filed | Aug. 14, 1968 |
| [45] | Patented | Oct. 27, 1970 |
| [73] | Assignee | Wagner Electric Corporation<br>Newark, New Jersey<br>a corporation of Delaware |

[54] CLOSED LOOP TYPE DISC BRAKE
16 Claims, 5 Drawing Figs.

| [52] | U.S. Cl. | 188/73.4 |
|---|---|---|
| [51] | Int. Cl. | F16d 55/224 |
| [50] | Field of Search | 188/73,<br>73(CL), 205 |

[56] References Cited
UNITED STATES PATENTS

| 3,310,135 | 3/1967 | Wells | 188/73 |
|---|---|---|---|
| 3,349,871 | 10/1967 | Walther et al. | 188/73 |
| 3,375,906 | 4/1968 | Hayes | 188/73 |
| 3,392,808 | 7/1968 | Soltis | 188/73 |
| 3,330,385 | 7/1967 | Swift | 188/73 |

FOREIGN PATENTS

| 1,459,110 | 10/1966 | France | 188/73 |
|---|---|---|---|

*Primary Examiner*—George E. A. Halvosa
*Attorney*—Joseph E Papin

ABSTRACT: A spot disc brake having support means defining a fixed closed loop member substantially about a chordal portion of a rotatable disc, and a cylinder portion slidably anchored on said closed loop member adjacent one side of said disc and including a caliper portion extending over said disc chordal portion and slidably anchored on said closed loop member adjacent to the other side of said disc for moving a pair of opposed friction members into frictional engagement with said one and other sides of said disc at the chordal portion thereof.

Patented Oct. 27, 1970

3,536,166

Sheet 1 of 2

INVENTOR
EDWARD J. FALK
BY
Joseph E. Papin

Patented Oct. 27, 1970 3,536,166
Sheet 2 of 2
FIG. 3
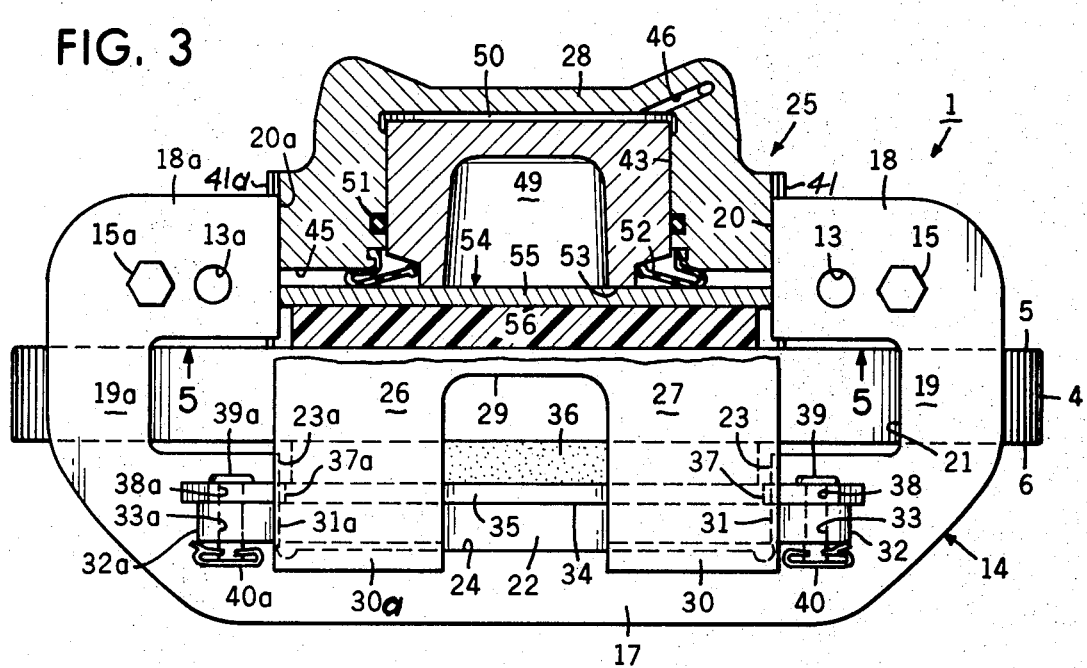
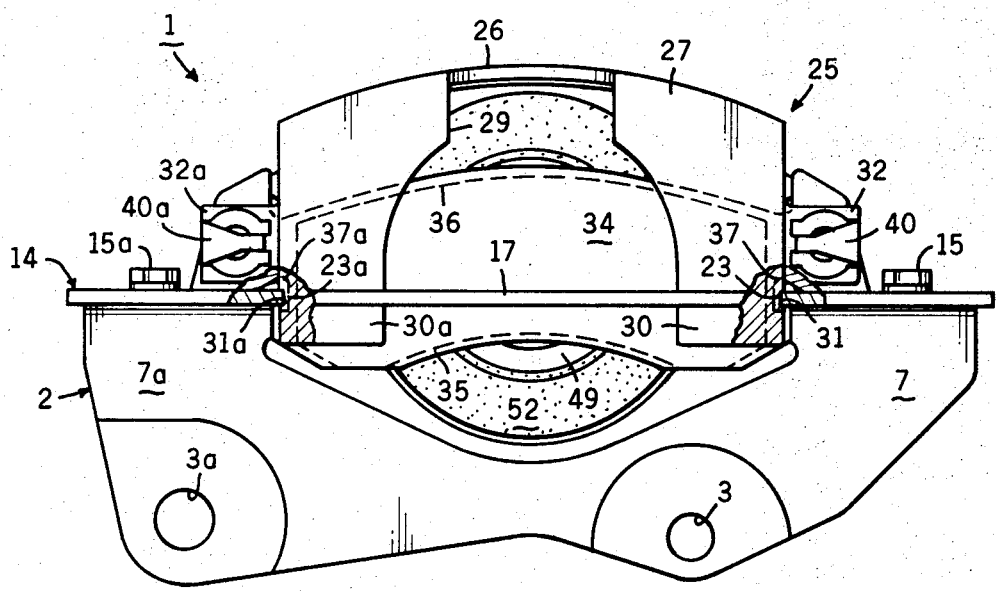
FIG. 4
INVENTOR
EDWARD J. FALK
BY
Joseph E. Papin.

3,536,166

1

CLOSED LOOP TYPE DISC BRAKE

This invention pertains to brake mechanisms and in particular to a spot type disc brake.

In the past, spot type disc brakes for use with a rotatable disc were provided with a support or spider member adjacent to one side of the disc for fixed connection with a vehicle structural member, and a cylinder portion was slidably anchored on said support, said cylinder portion also having a caliper portion integrally formed therewith extending over the disc periphery and juxtaposed with the other side of the disc. A piston was movable in the cylinder portion in one direction in response to fluid pressure applied thereto to urge a friction member into frictional engagement with the one side of said disc, and the torque of this frictional engagement was usually transmitted from the friction member directly to an anchor on the support. The cylinder portion was also movable on the support in the opposite direction in response to the applied fluid pressure acting thereon to concertedly move the caliper portion and another friction member carried thereon toward frictional engagement with the other side of the disc, and the torque of the frictional engagement of said other friction member and disc was transmitted through the caliper portion and the cylinder portion to the anchor on the support. Of course, twisting moments acting on the caliper portion were also created upon the frictional engagement of the one and other friction members with the disc which were also transmitted through said caliper portion and the cylinder portion to the anchor on the support. One of the disadvantageous or undesirable features of such past disc brakes was that the physical dimensions or proportions of the support were manifestly rather large since the force of the frictional engagement of both friction members was transferred to only one anchor on said support, and the twisting moment exerted on the caliper portion was also opposed by the same one anchor on said support. In other words, the load imparted by the torque of the frictional engagement and by the twisting moments on the one anchor necessitated a rather large and heavy structural design of the support, and further, the rather large structural size of said support effected mounting difficulties for the brake due to the scarcity of available "under-the-hood" space in the modern vehicle. The rather large structural size of the support not only appreciably added to the unsprung mass of the vehicle, which is also a critical factor in the modern vehicle, but also created assembly problems during the production of the vehicle. Another disadvantageous or undesirable feature of such past disc brakes was that the twisting moment created during braking effected tapered wear of the friction material on the friction members which appreciably reduced the wear life of the friction material necessitating more frequent replacement thereof.

The principal object of the present invention is to provide a sliding caliper type spot disc brake which overcomes the disadvantageous or undesirable features of the past spot disc brakes, as discussed hereinabove, and this, as well as other objects and advantageous features of the present invention, will become apparent from the specification which follows.

Briefly, the present invention comprises a friction device for use with a rotatable disc and having a pair of stationary support means generally defining a closed loop about substantially a chordal sector of said disc, a pair of friction members adjacent to the opposed sides of said disc, caliper means including opposed portions for urging said friction members into frictional engagement with said opposed disc sides, said support means respectively embracing said opposed portions and friction members, and one of said opposed portions including actuating means defining therewith cylinder means for subjection to fluid pressure applied thereto, said caliper means and actuating means being movable in opposite directions in response to fluid pressure applied thereto to frictionally engage said friction members with said opposed disc sides.

In the drawings wherein like numerals refer to like parts wherever they occur:

2

Figure 1:
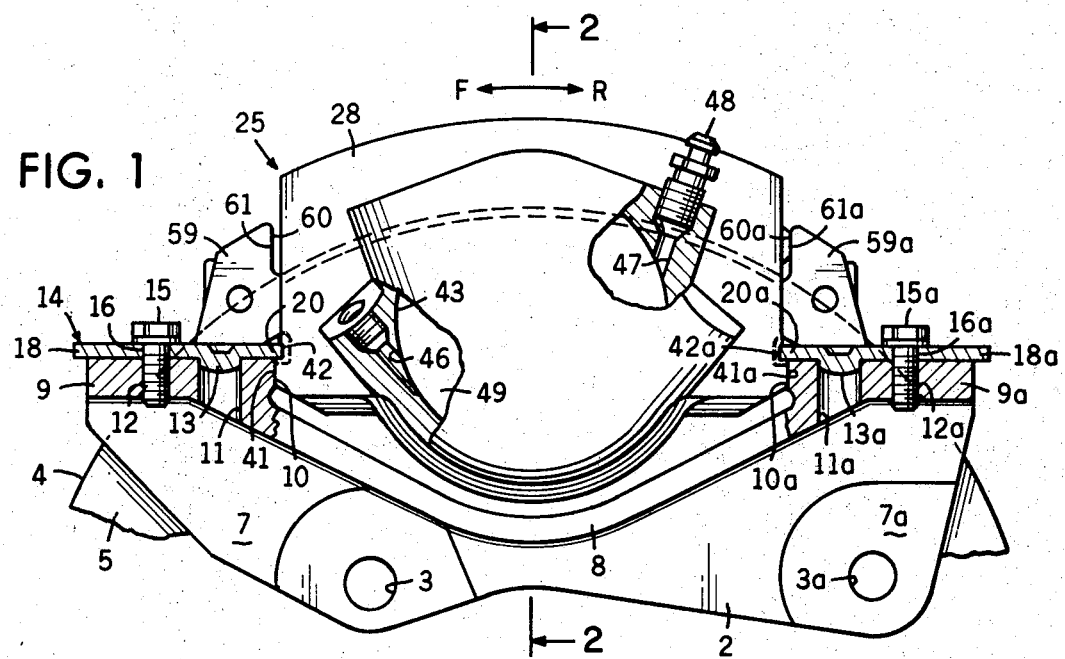
Figure 2:
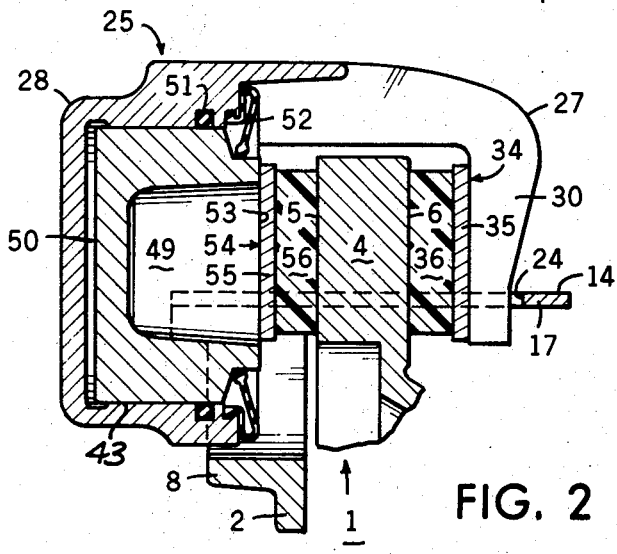

FIG. 1 is an elevational view partially in cross section showing the "inboard" side of the friction device embodying the present invention, FIG. 2 is a sectional view taken along line 2–2 of FIG. 1, FIG. 3 is a plan view partially in cross section of the friction device embodying the present invention, FIG. 4 is an elevational view partially in cross section showing the "outboard" side of the friction device embodying the present invention, and FIG. 5 is a partial sectional view taken along line 5–5 of FIG. 3.

Referring now to the drawings in detail and in particular to FIGS. 1 and 2, a friction device or disc brake 1 is provided with a support member or spider 2 having spaced mounting apertures 3, 3a therein for connection by suitable means to a vehicle structural member, such as a steering knuckle or axle flange (not shown), and said support member is positioned adjacent to a rotatable disc or to rotor 4 having opposed friction surfaces or inboard and outboard sides 5, 6, said disc being connected by suitable means for forward and reverse rotation, as indicated by the directional arrows in FIG. 1, with a vehicle wheel hub (not shown).

The support member 2 is provided with integrally formed and oppositely extending arm portions 7, 7a substantially parallel with and adjacent to the disc inboard side 5, and a reenforcing rib 8 having a generally arcuate shape is integrally formed with said arm portions and substantially normal thereto. Opposed spaced anchor flanges 9, 9a are also provided on the support member 2 being integrally formed with the arm portions 7, 7a and rib 8 adjacent to the opposed ends thereof, and said anchor flanges extend in a plane substantially normal to said arm portions and to the disc inboard side 5. The anchor flanges 9, 9a are provided with opposed inner ends or anchoring surfaces 10, 10a which extend in substantially vertical planes normal to the disc inboard side 5, and detent receiving apertures 11, 11a and threaded apertures 12, 12a are vertically provided through said anchor flanges 9, 9a to respectively receive spaced positioning detents 13, 13a provided on another support member or plate 14 and studs 15, 15a for fixedly connecting said support plate with said anchor flanges, said support plate also having stud receiving apertures 16, 16a therein aligned with the threaded apertures 12, 12a.

Referring now to FIGS. 1–3, the support plate 14 extends generally chordwise of the disc 4, and said support plate and the support member 2, in effect, define a stationary closed loop about a substantially chordal sector of said disc. The support plate 14 is provided with a reaction or frame portion 17 at the disc outboard side 6 and opposed connecting tabs or portions 18, 18a at the disc inboard side 5, said connecting portions and frame portion being integrally connected together by opposed end portions 19, 19a which respectively extend across the outer periphery of the disc 4. It should be noted that the peripheral edges of the support plate 14 can, if desired, be flanged for added strength purposes. The positioning detents 13, 13a and stud receiving apertures 16, 16a, as previously mentioned, are respectively provided in the connecting portions 18, 18a of the support plate 14 wherein said detents and studs 15, 15a fixedly interconnect said connecting portions with the anchor flanges 9, 9a of the support member 2. The connecting portions 18, 18a are provided with opposed free ends or retaining lips 20, 20a which respectively overlap the anchor surfaces 10, 10a of the support member 2, and said free ends intersect with the inboard side of an opening 21 in the support plate 14 through which a peripheral or chordal sector of the disc 4 rotates. The frame portion 17 of the support plate 14 is provided with a recess 22 having opposed side walls or anchor surfaces 23, 23a in substantially facing parallel relation which intersect with the outboard side of the opening 21, and said recess is also provided with a base wall 24 interconnected between the anchor surfaces 23, 23a.

Referring now to FIGS. 2–4, a sliding caliper member, indicated generally at 25, is provided with an intermediate portion 26 extending over the periphery of the disc 4 at the chordal sector thereof and integrally interconnected between depending reaction and cylinder portions 27, 28 which extend generally parallel to the disc outboard side 6 and inboard side 5. The caliper intermediate and reaction portions 26, 27 are bifurcated at 29 to define opposed reaction legs or segments 30, 30a, and said reaction legs are respectively provided with opposed anchoring grooves 31, 31a which are slidably received on the frame portion 17 of the support plate 14 embraced by or in sliding anchoring engagement with the anchors 23, 23a. The reaction legs 30, 30a are respectively provided with integral extensions or friction member carrying hubs 32, 32a having pin receiving apertures 33, 33a therethrough. An outboard friction member 34 is provided with a backing plate or pad member 35 in abutting or driven engagement with the reaction legs 30, 30a, and a friction material or brake lining 36 for frictional engagement with the disc outboard side 6 is fixedly connected with said pad by suitable means, such as the well known bonding method. Opposed guide or retaining grooves 37, 37a are provided in the opposite sides or ends of the pad 35, and the anchors 23, 23a on the frame portion 17 of the support plate 14 are respectively received in said grooves. The pad 35 is also provided with mounting apertures 38, 38a axially aligned with the apertures 33, 33a of the reaction leg hubs 32, 32a, and connecting or thrust pins 39, 39a are fixedly received in said apertures 32, 32a and 38, 38a against displacement by removable spring clips 40, 40a. In this manner, the pad 35 is fixedly received on or connected to the reaction legs 30, 30a by the thrust pins 39, 39a, and as discussed fully hereinafter, braking torque or thrust is transmitted from the pad 35 through said thrust pins to said reaction legs and therefrom to the anchors 23, 23a. It should be noted that the pad grooves 37, 37a are spaced from the anchors 23, 23a to obviate braking torque transmission therebetween; however, if desired, said pad grooves could be engaged with said anchors to effect such braking torque transmission therebetween.

Referring now to FIGS. 1—3, the caliper cylinder portion 28 is also provided with opposed anchor surfaces 41, 41a on the opposed ends thereof embraced by or in sliding anchoring engagement with the anchors 10, 10a of the support member anchor flanges 9, 9a, respectively, and guide grooves 42, 42a are also provided in the opposed ends of said caliper cylinder portion in guiding and displacement preventing engagement with the guides 20, 20a on the support plate connecting portions 18, 18a. As discussed fully hereinafter, braking torque is not transmitted between the grooves 42, 42a of the caliper cylinder portion 28 and the guides 20, 20a of the support plate connecting portions 18, 18a; however, said grooves 42, 42a and guides 20, 20a could be engaged, if desired, to effect braking torque transmission therebetween. A blind bore 43 is centrally provided in the caliper cylinder portion 28 intersecting with an interior wall or abutment 45 thereof which extends generally parallel with the disc inboard side 5, and the bore 43 is intersected by inlet and bleeder ports 46, 47, said inlet port being adapted for selective connection with a fluid pressure source (not shown) and said bleeder port being closed by a bleeder plug 48 of a type well known in the art. A cup-shaped piston or actuating member 49 is slidably received in the blind bore 43 defining therewith an expansible fluid pressure chamber 50 connected in pressure fluid communication with the inlet port 46 and, when desired, bleeding communication with the bleeder port 47. A sealing member or O-ring 51 which is retained in the bore 43 is sealably engaged with the peripheral portion of the piston 49, and another sealing member or boot 52 has its radially outer end retained in said bore while its other or radially inner end thereof extends into sealing engagement with said piston adjacent to the exterior driving or force transmitting end 53 thereof.

Referring to FIGS. 1, 3 and 5, and inboard friction member 54 is provided with a shoe or pad member 55 in driven engagement with the driving end 53 of the piston 49, and a friction material or brake lining 56 for frictional engagement with the disc inboard side 5 is fixedly connected with said pad by suitable means, such as the well known bonding method. The pad 55 is provided with opposed anchoring surfaces 57, 57a which are embraced by or in sliding anchoring engagement with the anchors 10, 10a of the support member anchoring flanges 9, 9a, respectively, and opposed guide grooves 58, 58a are also provided in said pad for respective guiding displacement preventing engagement with the guides 20, 20a on the support plate connecting portions 18, 18a. To complete the description of the friction device 1, oppositely extending anchoring ears or flanges 59, 59a are integrally provided on the opposed ends of the pad 55, and opposed anchoring surfaces 60, 60a are provided on said flanges in sliding and anchoring engagement with cooperating opposed anchors 61, 61a integrally provided on the opposed ends of the caliper 25.

In the operation with the disc 4 rotating in the forward direction, fluid pressure is selectively applied to the chamber 50 of the caliper cylinder portion 28 through the inlet port 46, and the applied fluid pressure acts on the effective area of the piston 49 in said chamber to establish a force for moving said piston in a friction device energizing direction toward the disc inboard side 5. Since the exterior end 53 of the piston 49 is drivingly engaged with the pad 55, the established force concertedly moves said piston and pad to urge the lining 56 into frictional engagement with the disc inboard side 5 to retard the rotation of the disc 4. The friction device applying movement of the pad 55 is guided by the cooperative sliding engagement of the pad anchor surfaces 41, 41a and 60, 60a on the support member anchors 10, 10a and the caliper anchors 61, 61a, respectively. The torque of the frictional engagement between the lining 56 and the disc inboard side 5 is transmitted from said lining through the pad 55 and the pad anchoring surface 57 directly to the support member anchor 10, and said torque is also transmitted from said pad through the pad ear 59a and the pad ear anchoring surface 60a to the caliper anchor 61a and therefrom through the caliper 25 and its anchoring surface 41 to said support member anchor 10. Of course, the engagement between the grooves 42, 42a of the caliper cylinder portion 28 with the ends 20, 20a on the connecting portions 18, 18a of the support plate prevents vertical displacement of the caliper 25 in response to the braking torque established upon the frictional engagement of the lining 56 with the disc inboard side 5.

At the same time, the applied fluid pressure in the chamber 50 also acts on the effective area of the caliper cylinder portion 28 in said chamber to establish a reaction force for moving the caliper in a friction device energizing direction opposite to that of the piston 49, as discussed hereinabove. The movement of the caliper 25 in the opposite direction is guided by the cooperative sliding engagement of anchor surfaces 41, 41a of the caliper cylinder portion 28 and the anchor surfaces 31, 31a on the caliper reaction legs 30, 30a with the support member anchors 10, 10a and the support plate anchors 23, 23a, respectively. The reaction force effecting the caliper movement in the opposite direction is transferred through the caliper cylinder and intermediate parts 28, 26 to the reaction legs 30, 30a to effect the concerted movement in the opposite direction of the pad 35 urging the lining 36 into frictional engagement with the disc outboard side 6 to retard the rotation of the disc 4 at substantially the same time the lining 56 is engaged with the inboard disc side 5, as previously discussed. The torque of the frictional engagement between the lining 36 and the disc outboard side 6 is transferred from said lining through the pad 35 to the thrust pins 39, 39a and therefrom through the hubs 32, 32a to the caliper reaction legs 30, 30a. Due to the anchoring engagement between the anchor surface 31 of the reaction leg 30 with the support plate anchor 23, the torque is transferred from said reaction leg 30 to the support plate 14 tending to urge said support plate in the forward direction; however, said support plate distributes the torque through its frame portion 17 and end portions 19, 19a to its connecting portions 18, 18a and therefrom to both of the connecting studs 15, 15a and both of the anchor flanges 9, 9a of the support member 2. Of course, the engagement between the grooves 31, 31a in the caliper reaction legs 30, 30a with the frame member 17 of the support plate 14 adjacent to the anchors 23, 23a prevents vertical displacement of the caliper 25 in response to the braking torque established upon the frictional engagement of the lining 36 with the disc outboard side 6.

It should be noted that the torque established between the lining 36 and disc outboard side 6 upon the frictional engagement thereof establishes a force component substantially in the plane of said frictional engagement acting in the forward direction and having a moment about the connecting stud 15 which tends to twist the caliper 25; however, this twisting moment is opposed by the rigidity of the support plate 14, and the twisting force is also distributed through said support plate to both of the connecting studs 15, 15a and therefrom to both of the anchor flanges 9, 9a of the support member 2, as previously discussed with regard to braking torque. In this manner, it is obvious that the aforementioned twisting moment acting on the caliper 25 is substantially obviated by the rigid interconnection of the support plate 14 and support member 2 which, of course, substantially obviates undesired tapered wear on the pad lining 36. In other words, the anchoring engagement between the reaction legs 30, 30a of the caliper 25 with the anchors 23, 23a of the rigid support plate 14 and the anchoring engagement between the caliper cylinder portion 28 and the anchors 10, 10a of the rigid support member 2 substantially obviates twisting or rotation of said caliper in response to moments produced by the transfer of braking torque from the pad 35 to said caliper thereby substantially obviating angular or tapered wear of the lining 36 and effecting relatively even wear over the wear life thereof.

When the disc 4 is rotated in the reverse direction, the torque from the pad 55 is transmitted directly to the support member anchor 10a, and said torque is also transmitted from the pad ear 59 and anchoring surface 60 to the caliper anchor 61 and therefrom through the caliper 25 and its anchoring surface 41a to said support member anchor 10a. The torque from the pad 36 is transferred through the pins 39, 39a and hubs 32, 32a to the caliper reaction legs 30, 30a. Due to the anchoring engagement between the anchor surface 31a of the reaction leg 30a with the support plate anchor 23a, the torque is transferred from said reaction leg 30 to the support plate 14 tending to urge said support plate in the reverse direction; however, said support plate distributes the torque through its frame portion 17 and end portions 19, 19a to its connecting portions 18, 18a and therefrom to both of the connecting studs 15, 15a and both of the anchor flanges 9, 9a of the support member 2. The twisting movement of the force component of the torque established during such a reverse stop acts in the reverse direction and has a moment arm about the connecting stud 15a, and such twisting movement during such reverse stop is distributed and opposed in the same manner as that previously discussed hereinbefore during the forward stop.

I claim:

1. A friction device for use with a rotatable disc comprising:
   a. support means defining a closed loop about substantially a chordal sector of said disc;
   b. caliper means including opposed portions respectively adjacent to the opposed sides of said disc;
   c. a pair of friction members between said opposed portions and said opposed disc sides, respectively;
   d. a pair of spaced anchor means on said support means embracing one of said portions and one of said friction members;
   e. another pair of spaced anchor means on said support means embracing the other of said portions which provides the only torque transmitting connection on said other side of the disc;
   f. said other pair of spaced anchor means being adapted to transmit braking torque and the vertical and twisting components thereof to said support means;
   g. and one of said one and other portions including actuating means defining therewith an expansible fluid pressure chamber;
   h. said actuating means and caliper means being movable in opposite directions in response to fluid pressure in said chamber to respectively urge said one friction member and the other of said friction members into frictional engagement with said opposed disc sides;
   i. a third pair of opposed anchor means on said caliper means;
   j. and said one friction member including opposed extension means, said extension means each having a guide surface slidable in said support means and an anchoring surface respectively engaged with said third anchor means; and
   k. said extension means being the only means for transmitting the braking torque and the vertical and twisting components thereof from said one friction member to said caliper means.

2. A friction device for use with a rotatable disc comprising:
   a. a first support adjacent to one side of said disc for mounting engagement with a vehicle structural member including a pair of integral opposed arms extending generally chordwise of said disc;
   b. a pair of anchor flanges on said arms within the periphery of said disc and extending in a direction away from said disc in a plane substantially normal thereto;
   c. each of said anchoring flanges having an anchor surface facing each other in substantially parallel relation;
   d. a second support extending in a plane substantially normal to the plane of said disc including a frame portion at the other side of said disc, a pair of opposed connecting portions spaced apart at said disc one side for respective connection with said anchor flanges, opposed ends on said connecting portion overlapping said anchor surfaces, respectively, a pair of end portions extending beyond the periphery of said disc and respectively interconnecting said connecting portions with said frame portion, said frame portion, end portions and connecting portions defining with said arms a closed loop about a substantially chordal sector of said disc;
   e. recess means in said frame portion having opposed side walls defining other anchor surfaces facing each other and within the periphery of said disc;
   f. a pair of studs respectively connected between said anchor flanges and said connecting portions rigidly interconnecting said second support in torque transmitting relation with said first support;
   g. a caliper including an intermediate portion extending over the periphery of said disc substantially at the chordal sector thereof and integrally interconnected between opposed cylinder and reaction portions extending generally in the plane of said disc respectively adjacent to said disc one and other sides;
   h. a first pair of opposed groove means in said reaction portion received on said frame portion in sliding anchoring engagement with said other anchor surfaces which provide the only torque transmitting connection on said other side of the disc for transmitting braking torque and the vertical and twisting components thereof to the said second support member;
   i. a second pair of opposed groove means in said cylinder portion respectively received in radial displacement preventing engagement with the opposed ends of said connecting portions;
   j. a third pair of opposed surfaces on said cylinder portion respectively in sliding anchoring engagement with said first named anchor surfaces on said anchor flanges;
   k. a bore in said cylinder portion;
   l. a piston slidable in said bore having an interior end defining with said bore an expansible fluid pressure chamber for subjection to actuating fluid pressure and a driving end exteriorly of said bore;

m. a first friction member between said cylinder portion and said disc one side including a backing plate having friction material on one side thereof for frictional engagement with said disc one side and the other side thereof being engaged with the driving end of said piston;

n. and opposed ends on said backing plate respectively in sliding anchoring engagement with said first named anchor surfaces on said anchor flanges;

o. and a second friction member including a second backing plate connected only with said reaction portion, and other friction material on one side thereof for frictional engagement with said disc other side;

p. said piston being movable in one direction in response to actuating fluid pressure in said chamber to frictionally engage said first friction member with said disc one side wherein the torque of said frictional engagement is transferred to one of said anchor flanges through the anchoring engagement between one of said opposed ends of said first friction member and one of said first named anchor surfaces;

q. and said caliper means also being movable in a direction opposite to the one direction in response to actuating fluid pressure in said chamber to frictionally engage said friction member with said disc other side wherein the torque of said frictional engagement and the vertical and twisting components therefore is transferred by said second support to each of said anchor flanges through the anchoring engagement of said first named groove means and said other anchor surfaces; and r. said other anchor surfaces being aligned with said reaction portion in a plane substantially parallel to that of said disc to substantially obviate a turning coupling effect on said caliper upon the frictional engagement of said second friction member with said disc other side.

3. In a rotating disc friction brake assembly of the type which includes a caliper that straddles the disc in position with an actuating cylinder portion adjacent one side of the disc and a reaction portion adjacent the second side of the disc and a pair of friction members between said portions and opposite sides of the disc wherein upon actuation of said cylinder one of said friction members is moved in one direction into frictional engagement with one side of the disc and the caliper and the second friction member is moved in opposite direction to bring the second friction member into frictional engagement with the second side of the disc, the improvement which comprises:

a. support means including a pair of spaced mounting means adjacent to one side of the disc;

b. a member connected in fixed position to said mounting means to define therewith a closed loop about a chordal sector of said disc in position surrounding said reaction portion of the caliper;

c. a first pair of spaced anchor means adapted to transmit braking torque and the vertical and twisting components thereof from said second friction member to said reaction portion of the caliper; and d. a second spaced pair of anchor means positioned within the periphery of the disc adapted to transmit braking torque and the vertical and twisting components thereof from said reaction portion of the caliper to said loop member and the mounting and support means.

4. A structure as specified in claim 3 in which the said first pair of spaced anchor means are the only means for transmitting the braking torque and the vertical and twisting components thereof from said second friction member to said reaction portion of the caliper.

5. A structure specified in claim 3 in which the said second pair of spaced anchor means are the only means for transmitting the braking torque and the vertical and twisting components thereof from said reaction portion of the caliper to said loop member on said second side of the disc.

6. A friction device for use with a rotatable disc comprising:

a. support means including a pair of spaced mounting means adjacent to one side of said disc;

b. a member connected with said mounting means and defining therewith a closed loop about substantially a chordal sector of said disc;

c. caliper means including opposed portions respectively adjacent to the opposed sides of said disc;

d. a pair of friction members between said opposed portions and said opposed disc sides, respectively;

e. a pair of spaced anchor means on said mounting means adjacent to said disc one side and within the periphery thereof embracing one of said portions and one of said friction members;

f. another pair of spaced anchor means on said member adjacent to the other side of said disc and within the periphery thereof embracing only the other of said portions;

g. said other spaced pair of anchor means being adapted to transmit braking torque and the vertical and twisting components thereof to said member;

h. said other pair of spaced anchor means being the only connection for transmitting braking torque and the vertical and twisting components thereof from said other caliper portion to said member on said other side of the disc;

i. a spaced pair of torque transmitting means connecting said other friction element and said other portion of the caliper;

j. said spaced pair of torque transmitting means being adapted to transmit all of the braking torque and the vertical and twisting components thereof to said other portion of the caliper;

k. said spaced pair of torque transmitting means being the only connection for transmitting all of the braking torque and the vertical and twisting components thereof from said other friction element to said other caliper portion;

l. and one of said one and other portions including actuating means defining therewith an expansible fluid pressure chamber;

m. said actuating means and caliper means being movable in opposite directions in response to fluid pressure in said chamber to respectively urge said one and other friction members into frictional engagement with said opposed disc sides; and n. the torque of said one friction element being transferred through one of said first named anchor means directly to one of said mounting means and the torque of said other friction element and the vertical and twisting components thereof being transferred from said other portion to said other anchor means and through said member to both of said mounting means.

7. The friction device according to claim 6, comprising a pair of spaced opposed anchor flanges on said mounting means and extending therefrom in a plane substantially normal to the plane of said disc, each of said anchor flanges having a surface in spaced facing relation defining said first named pair of anchor means, said member including a frame portion at said disc other side defining a side of said opening in the closed loop, recess means in said frame having other opposed surfaces in facing relation defining said other pair of anchor means, a pair of spaced connecting portions at the one disc side connected with said flanges and defining with said mounting means another side of said opening opposite the one side thereof, and a pair of end portions extending beyond the periphery of said disc interconnecting said frame portion with said connecting portions and defining the opposed ends of said opening interconnected between said one and opposite sides thereof, respectively.

8. The friction device according to claim 6, wherein said member includes a frame portion at the other side of said disc defining said other pair of anchor means, a pair of spaced opposed connecting portions at said one disc side respectively fixedly connected with said mounting means, and a pair of opposed end portions extending beyond the periphery of said disc and interconnecting said frame portion and said connecting portions, said frame portion, end portions and connecting portions defining with said mounting means the closed loop about substantially the disc chordal sector.

9. The friction device according to claim 8, comprising a pair of spaced opposed anchor flanges on said mounting means defining said first named pair of anchor means and extending in a plane substantially normal to the plane of said disc, and means fixedly connecting said anchor flanges with said connecting portions, respectively.

10. The friction device according to claim 8, comprising a pair of opposed surfaces on said one portion slidable on said first named pair of anchor means in anchoring engagement therewith, and another pair of opposed surfaces on said other portion slidable on said other pair of anchoring means in anchoring engagement therewith.

11. The friction device according to claim 10, comprising a pair of opposed free ends respectively on said connecting portions, and groove means in said one portion slidably received on said opposed ends in radial displacement preventing engagement therewith.

12. The friction device according to claim 10, comprising recess means in said frame portion having opposed side walls defining said other pair of anchor means, and a pair of opposed groove means in said other portion received on said frame portion in radial displacement preventing engagement therewith and in sliding anchoring engagement with said opposed side walls.

13. The friction device according to claim 8, comprising a pair of opposed free ends respectively on said connecting portions, a pair of opposed groove means in said one portion slidably received on said opposed free ends in radial displacement preventing engagement therewith, recess means in said frame portion having opposed side walls defining said other pair of anchor means, and another pair of opposed groove means in said other portion received on said frame portion in radial displacement preventing engagement therewith and in sliding anchoring engagement with said opposed side walls, a pair of spaced opposed anchor flanges on said mounting means and extending from said support means in a plane substantially normal to the plane of said disc, means respectively connected between said anchor flanges and said connecting portions for rigidly interconnecting said member and said mounting means, a pair of surfaces on said anchor flanges in opposed facing relation defining said first named pair of anchor means, and another pair of opposed surfaces on said one portion in sliding anchoring engagement with said first named pair of surfaces, respectively.

14. The friction device according to claim 13, wherein said one friction member includes opposed ends in sliding anchoring engagement with said first named pair of surfaces, the torque of the frictional engagement between said one friction member and said disc one side being transferred between one of said opposed friction member ends and one of said first named pair of surfaces to one of said anchor flanges.

15. The friction device according to claim 14, comprising a third pair of opposed anchor means on said caliper means, and a pair of opposed flanges on said one friction member in sliding anchoring engagement with said third pair of anchor means, respectively, a portion of the torque of the frictional engagement between said one friction member and said disc one side being transferred by said caliper means through the anchoring engagement of one of said friction member flanges with one of said third pair of anchor means to said one anchor flange, and a pair of guide surfaces on said friction element flanges respectively in sliding engagement with said member.

16. The friction device according to claim 14, comprising a third pair of anchor means on said caliper means, and a pair of opposed flanges on said one friction member including a third pair of anchor surfaces in sliding anchoring engagement with said third pair of anchor means, and a pair of guide surfaces in sliding and guiding engagement with said member, a portion of the torque of the frictional engagement between said one friction member and said disc one side being transferred by said caliper means to said one anchor flange through the anchoring engagement of one of said friction member flanges and one of said third pair of anchor means and through the anchoring engagement of said one of said opposed friction member ends with said one of said first named pair of surfaces.